(12) United States Patent
Higgins et al.

(10) Patent No.: US 8,879,067 B2
(45) Date of Patent: Nov. 4, 2014

(54) WAVELENGTH DEPENDENT OPTICAL FORCE SENSING

(75) Inventors: Richard J. Higgins, Westerville, OH (US); Philip R. Swinehart, Columbus, OH (US); Mokhtar M. Maklad, Westerville, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 190 days.

(21) Appl. No.: 13/222,811

(22) Filed: Aug. 31, 2011

(65) Prior Publication Data

US 2012/0050735 A1   Mar. 1, 2012

Related U.S. Application Data

(60) Provisional application No. 61/379,331, filed on Sep. 1, 2010.

(51) Int. Cl.
*G01B 9/02* (2006.01)
*G01L 1/24* (2006.01)
*G01L 3/12* (2006.01)
*G01L 1/25* (2006.01)
*G01L 9/00* (2006.01)
*G01P 15/093* (2006.01)

(52) U.S. Cl.
CPC .............. *G01L 9/0077* (2013.01); *G01L 1/24* (2013.01); *G01L 3/12* (2013.01); *G01L 1/25* (2013.01); *G01P 15/093* (2013.01)
USPC ........................................ 356/450

(58) Field of Classification Search
CPC ................ G01L 1/24; G01L 1/25; G01L 1/12
USPC ..................... 356/457, 521, 35.5; 73/514.26
See application file for complete search history.

(56) References Cited

U.S. PATENT DOCUMENTS

| | | |
|---|---|---|
| 4,307,516 A | 12/1981 | Walker |
| 4,332,090 A | 6/1982 | Bailey |
| 4,342,907 A | 8/1982 | Macedo |
| 4,376,390 A | 3/1983 | Rines |
| 4,451,730 A | 5/1984 | Brogardh |
| 4,463,254 A | 7/1984 | Asawa |
| 4,567,771 A | 2/1986 | Nelson |
| 4,626,680 A | 12/1986 | Martens |
| 4,666,299 A | 5/1987 | Tamaki |
| 4,697,876 A | 10/1987 | Dyott |
| 4,765,739 A | 8/1988 | Koizumi |
| 4,789,236 A | 12/1988 | Hodor |
| 4,893,930 A | 1/1990 | Garrett |
| 4,932,263 A | 6/1990 | Wlodarczyk |
| 4,984,863 A | 1/1991 | Parriaux |
| 5,208,647 A | 5/1993 | Longa |
| 5,267,336 A | 11/1993 | Sriram |
| 5,289,719 A | 3/1994 | Egley |
| 5,317,929 A | 6/1994 | Brown |
| 5,373,153 A | 12/1994 | Cumberledge |

(Continued)

*Primary Examiner* — Kara E Geisel
*Assistant Examiner* — Maurice Smith
(74) *Attorney, Agent, or Firm* — Nixon & Vanderhye P.C.

(57) ABSTRACT

Sensors operate by resolving changes in orientation of a wavelength dependent structure with respect to a reference direction determined by an incident light beam, resulting in very high sensitivity and dynamic range. Said sensors are wavelength encoded, can be multiplexed in a single light path such as an optical fiber, yet are decoupled mechanically from the fiber, resulting in high stability.

32 Claims, 10 Drawing Sheets

Non-Limiting Example Optical Force Transducer

(56) References Cited

U.S. PATENT DOCUMENTS

| | | |
|---|---|---|
| 5,410,917 A | 5/1995 | Giversen |
| 5,425,179 A | 6/1995 | Nickel |
| 5,769,051 A * | 6/1998 | Bayron et al. ............. 123/335 |
| 5,892,860 A | 4/1999 | Maron |
| 6,018,390 A | 1/2000 | Youmans |
| 6,078,706 A * | 6/2000 | Nau et al. .................. 385/12 |
| 6,175,108 B1 | 1/2001 | Jones |
| 6,218,661 B1 | 4/2001 | Schroeder |
| 6,285,182 B1 | 9/2001 | Blake |
| 6,320,992 B1 | 11/2001 | Goldner |
| 6,422,084 B1 | 7/2002 | Fernald |
| 6,522,797 B1 | 2/2003 | Siems |
| 6,563,967 B2 | 5/2003 | Tweedy |
| 6,955,085 B2 | 10/2005 | Jones |
| 6,961,501 B2 * | 11/2005 | Matsuura et al. ............ 385/129 |
| 7,004,038 B2 * | 2/2006 | Tsai ......................... 73/861.71 |
| 7,020,354 B2 | 3/2006 | Lagakos |
| 7,137,299 B2 | 11/2006 | Meyer |
| 7,305,771 B2 | 12/2007 | Lin |
| 7,319,514 B2 | 1/2008 | Ritchie |
| 7,345,953 B2 | 3/2008 | Crickmore |
| 7,372,254 B2 * | 5/2008 | Proksch et al. .......... 324/207.18 |
| 7,554,674 B2 * | 6/2009 | Carr ............................ 356/519 |
| 2004/0129868 A1 * | 7/2004 | Kilmartin ................ 250/227.14 |
| 2008/0034866 A1 * | 2/2008 | Kilic et al. ................ 73/514.26 |
| 2011/0268384 A1 * | 11/2011 | Akkaya et al. ................ 385/12 |

* cited by examiner

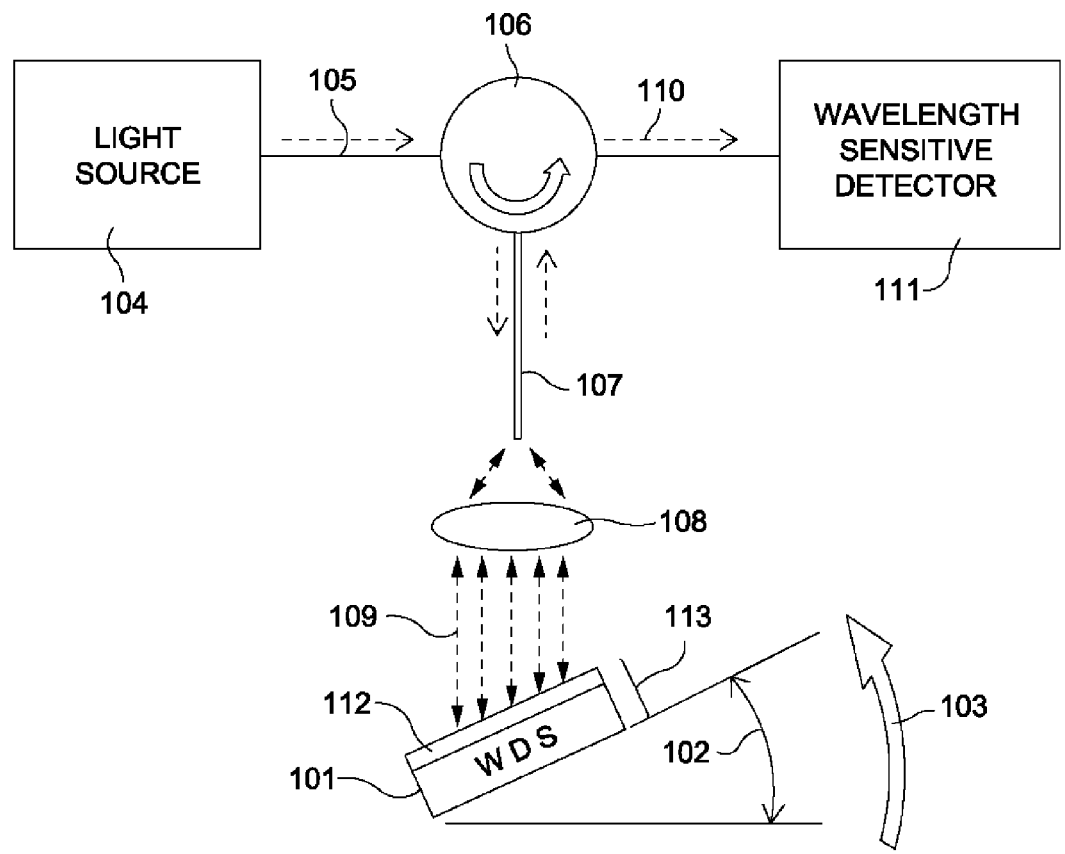
Fig. 1  Non-Limiting Example Optical Force Transducer

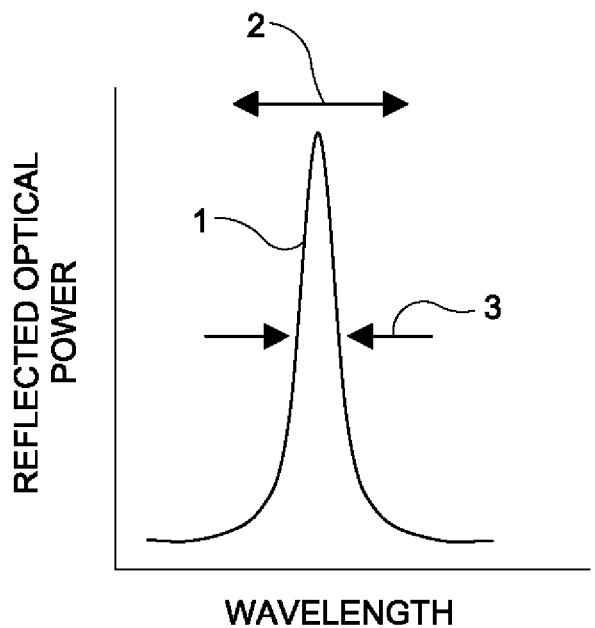
Fig. 2a  Example Resonant Peak
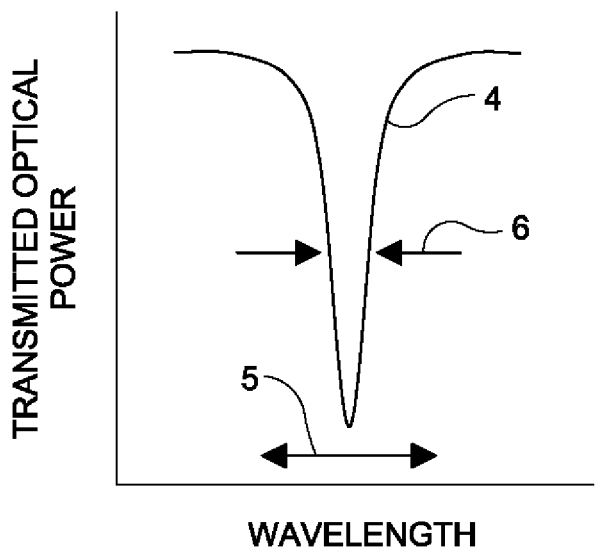
Fig. 2b  Example Resonant Valley

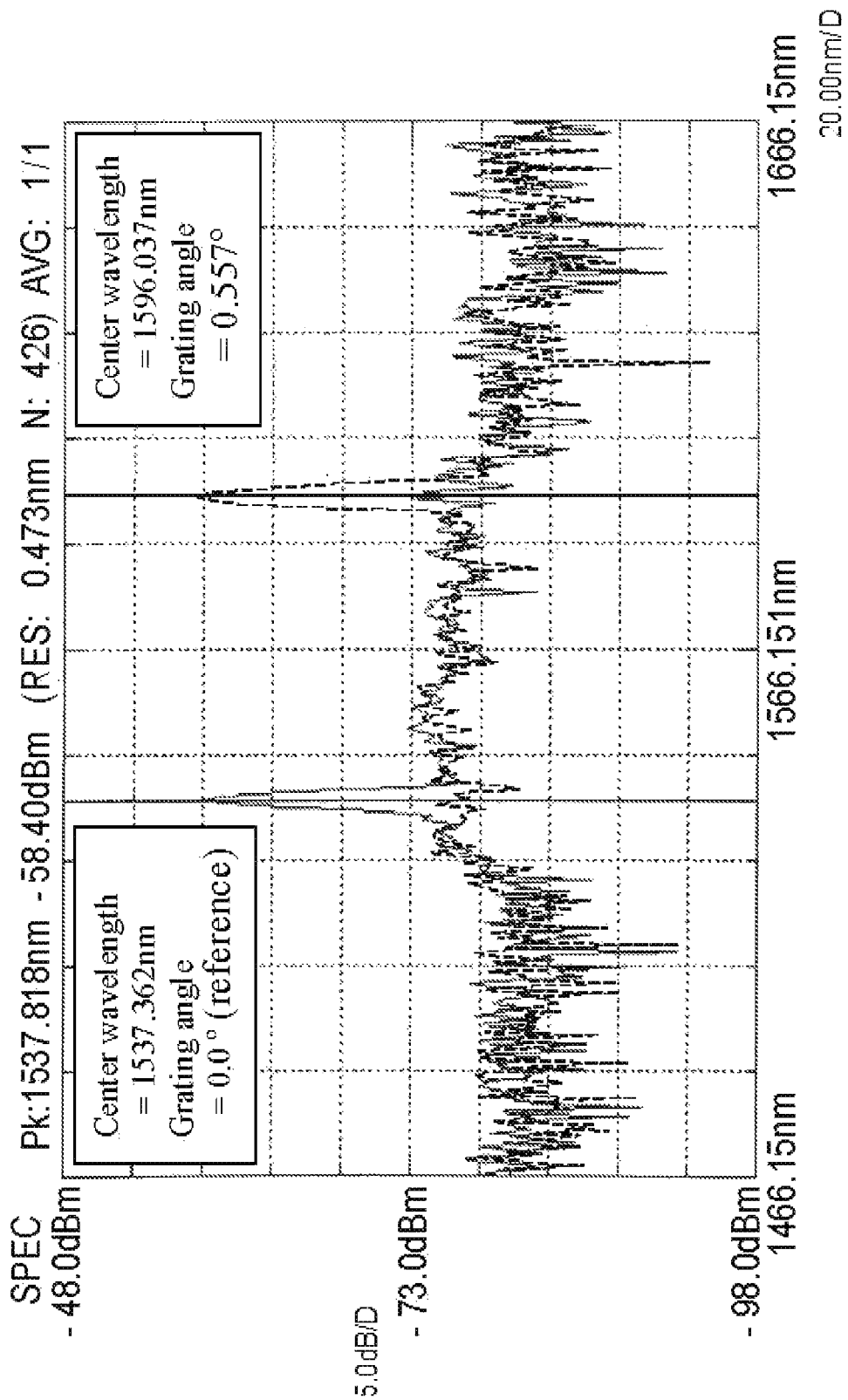
Fig. 2c  Example Resonant Peak Positions

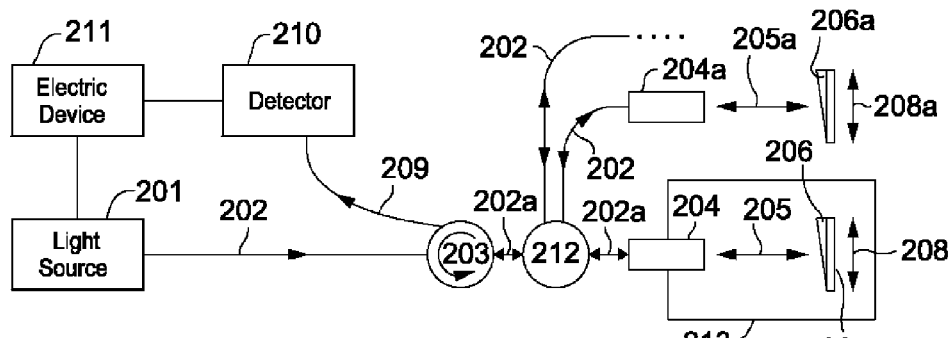
Fig. 3a  REFLECTIVE
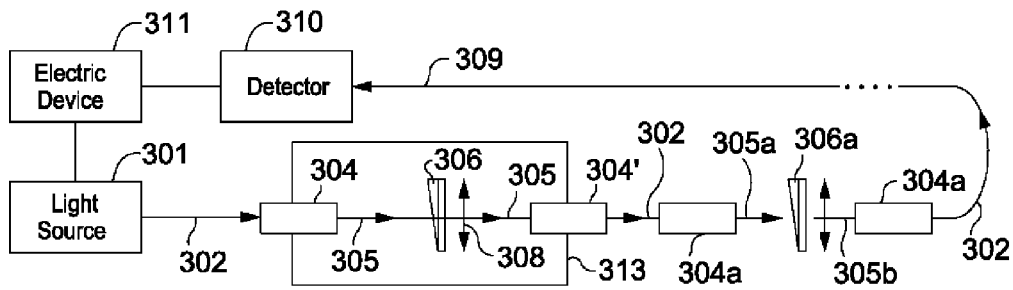
Fig. 3b  TRANSMISSION
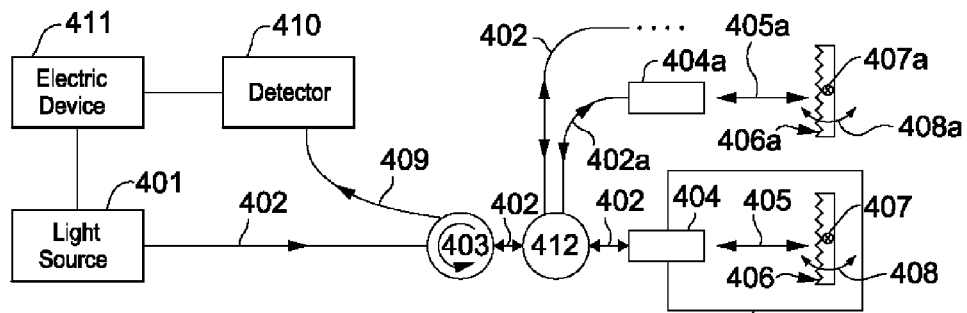
Fig. 4a  REFLECTIVE
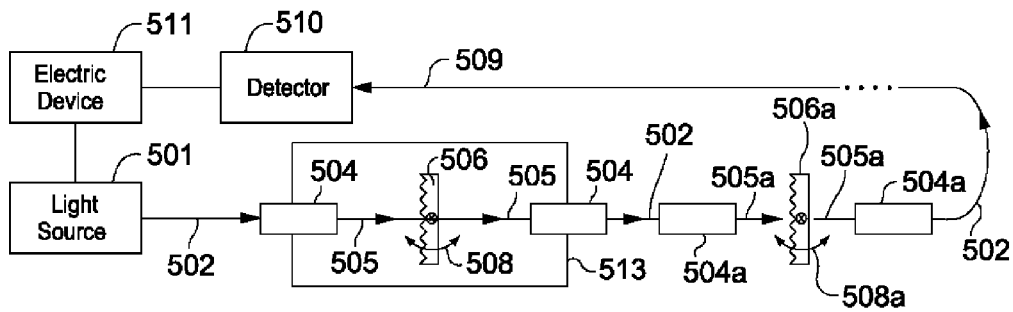
Fig. 4b  TRANSMISSION

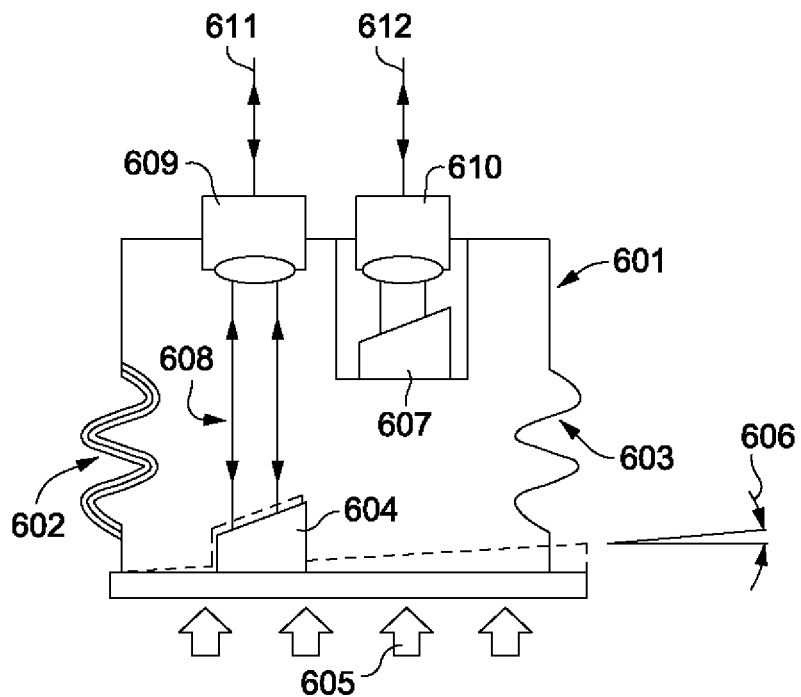
Fig. 5  Example Pressure or Force Sensor with Temperature Compensation
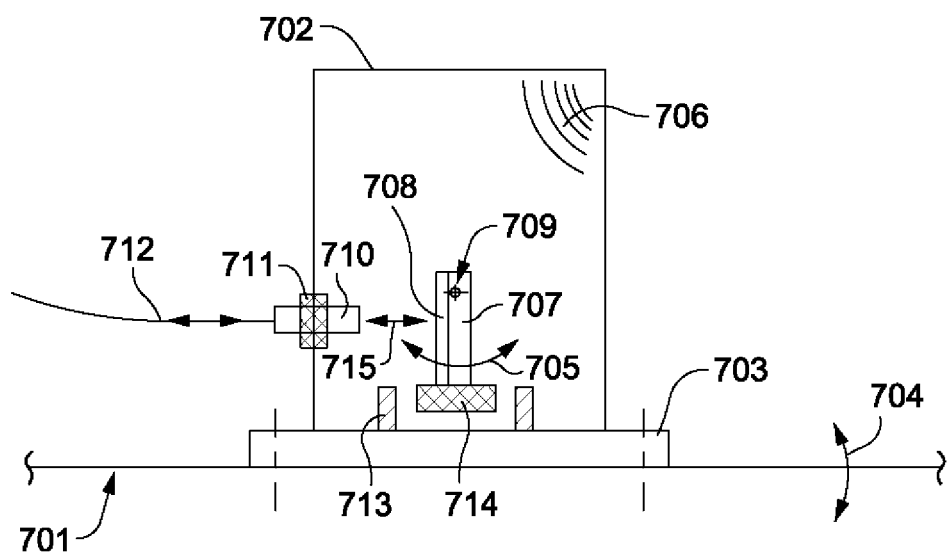
Fig. 6  Example Tilt Meter

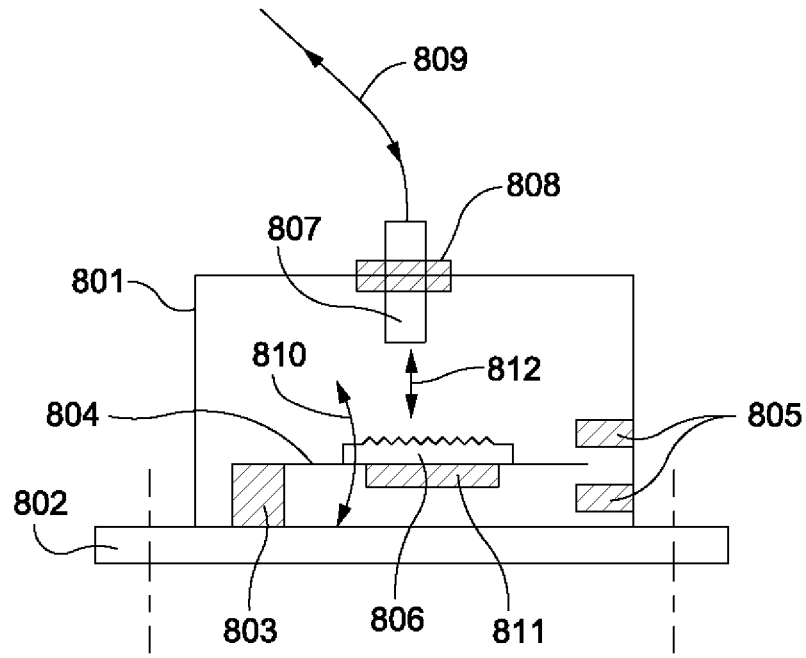
Fig. 7  Example Accelerometer
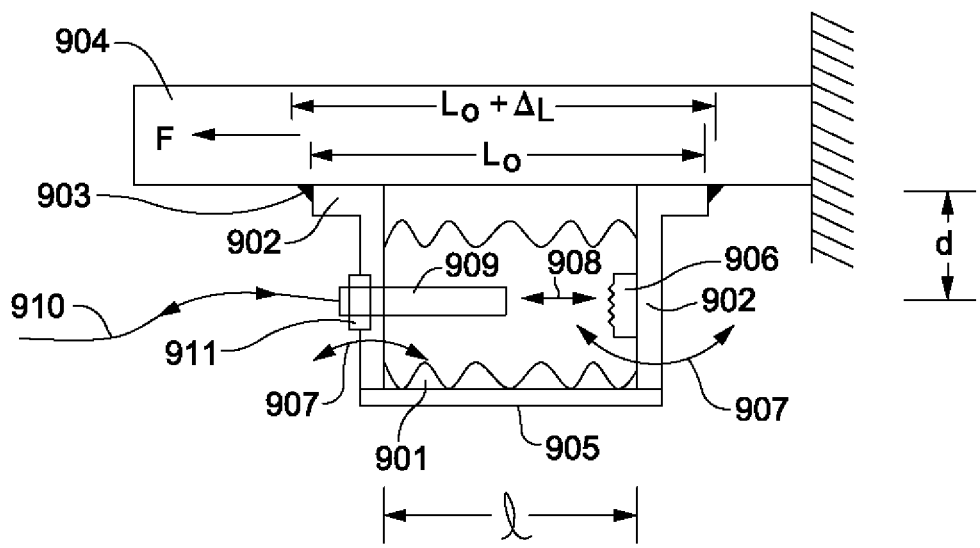
Fig. 8  Example Strain Sensor

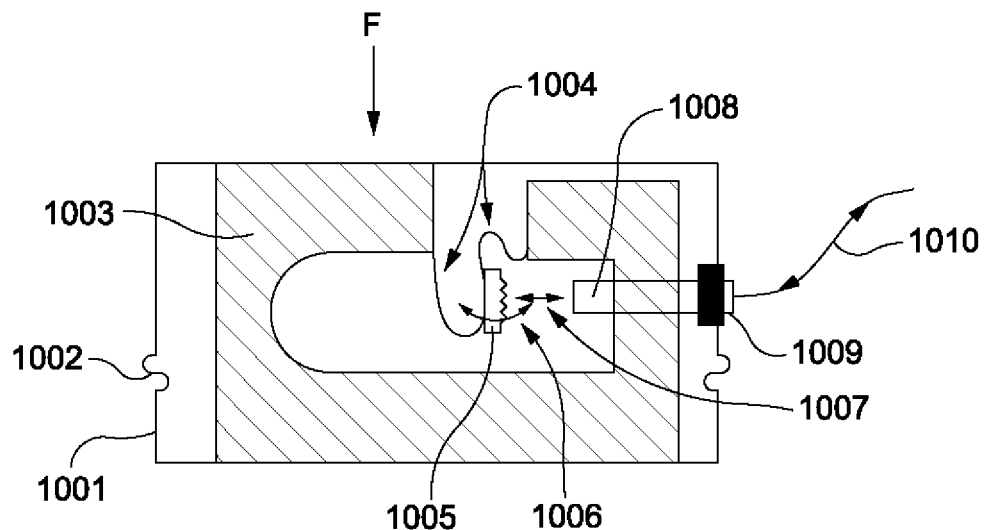
Fig. 9  Example Load Sensor
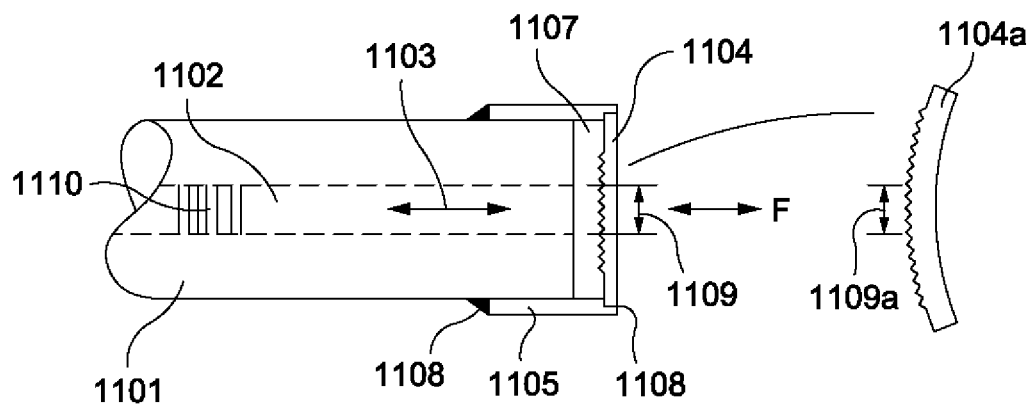
Fig. 10  Example Diaphragm Pressure Sensor

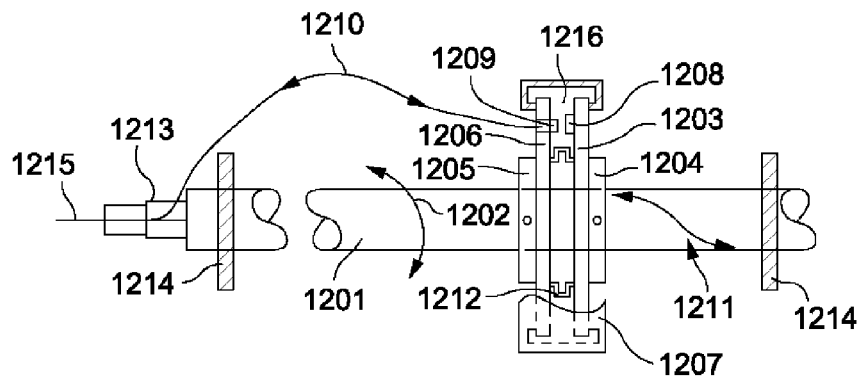
Fig. 11  Example Rectilinear Torque Sensor
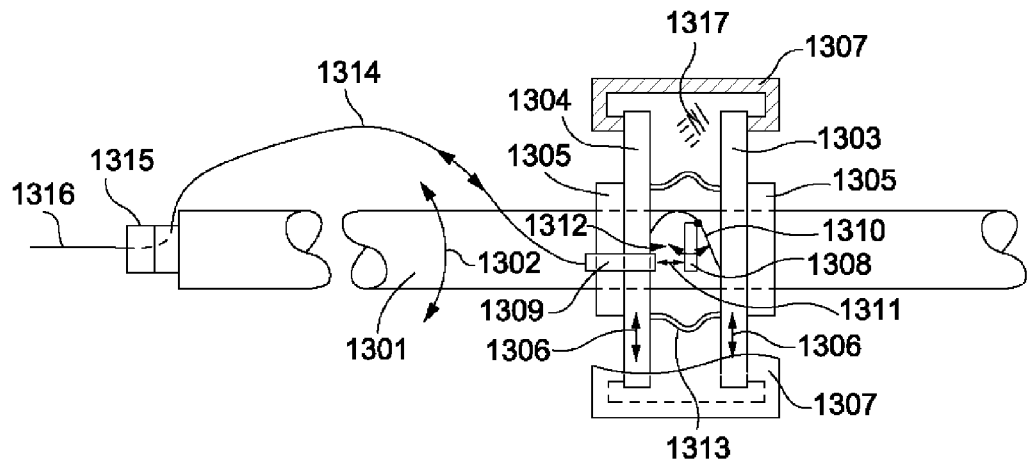
Fig. 12  Example Rotary Torque Sensor
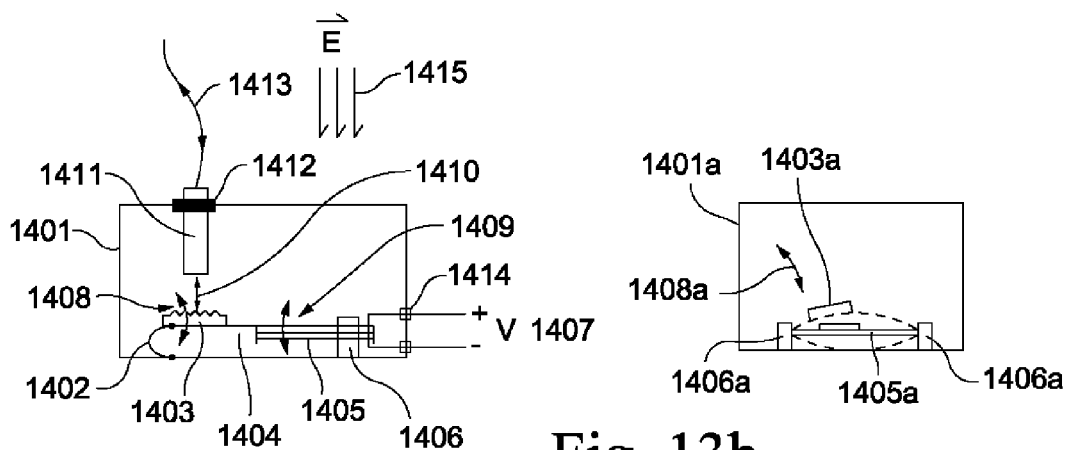
Fig. 13a  Example Rotary Electric Field Transducer
Fig. 13b  Example Rotary Electric Field Transducer

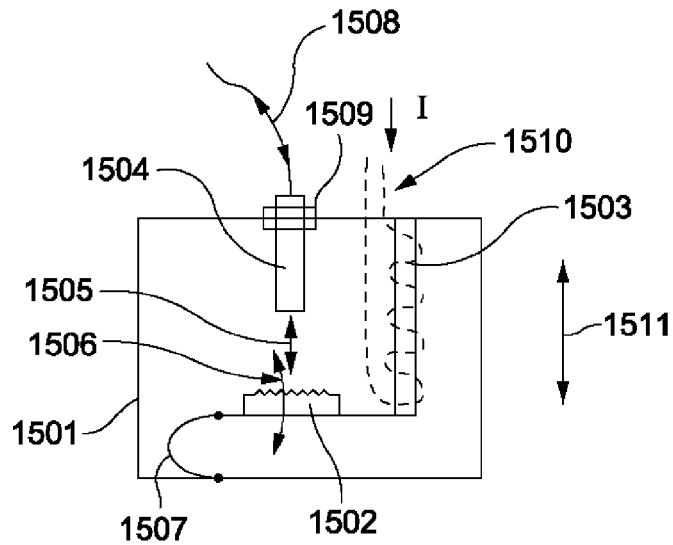
Fig. 14  Example Rotary Current or Magnetic Field Transducer
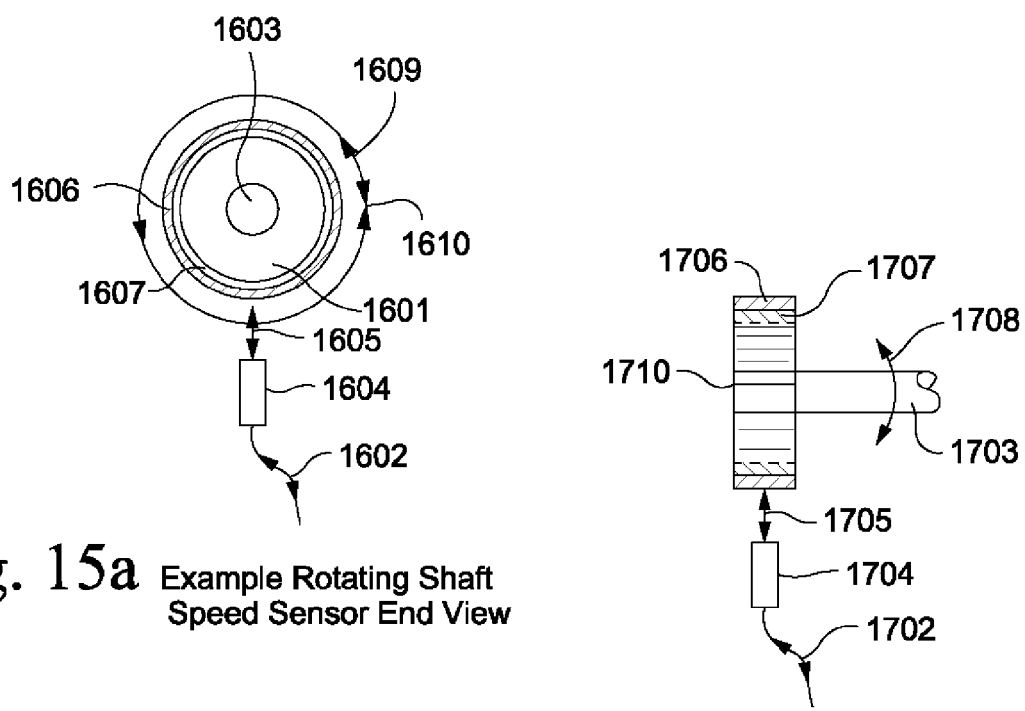
Fig. 15a  Example Rotating Shaft Speed Sensor End View
Fig. 15b

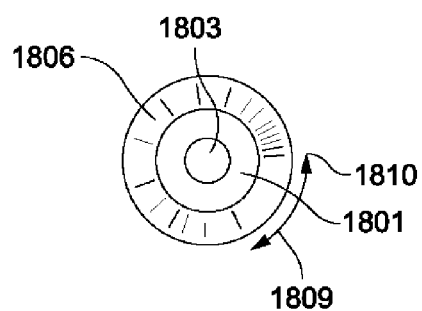
Fig. 16a  Example Rotating Shaft Speed Sensor End View
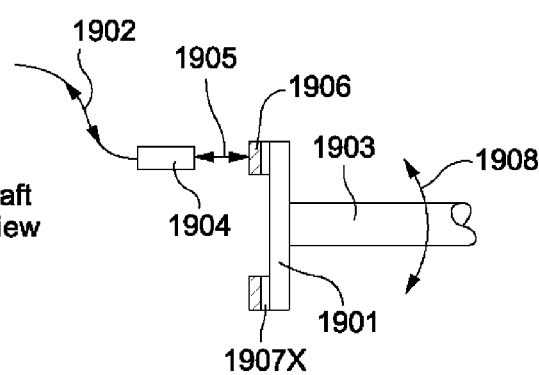
Fig. 16b  Example Rotating Shaft Speed Sensor Side View
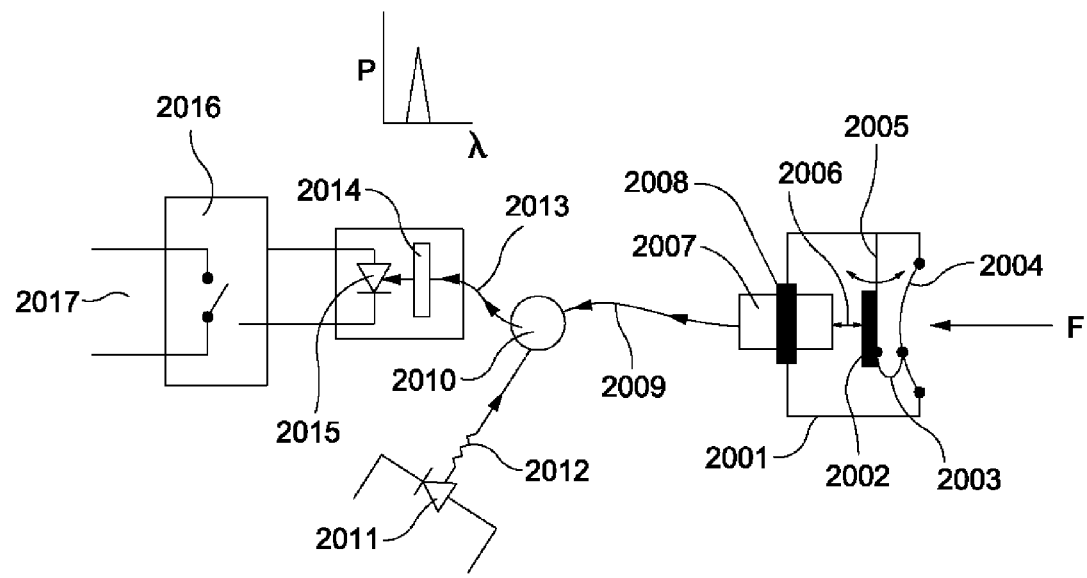
Fig. 17  Example Explosion-Proof Switch

WAVELENGTH DEPENDENT OPTICAL FORCE SENSING

CROSS-REFERENCES TO RELATED APPLICATIONS

This application claims the benefit of Provisional Application No. 61/379,331, filed Sep. 1, 2010, which is hereby incorporated by reference.

STATEMENT REGARDING FEDERALLY SPONSORED RESEARCH OR DEVELOPMENT

Not applicable.

FIELD

The technology herein relates to wavelength-encoded optical sensors, and more particularly to wavelength-encoded measurement of various physical parameters by resolving changes in orientation of a wavelength dependent structure (WDS) due to an applied force with respect to a reference direction determined by an interrogating light beam incident on, and interacting with, said WDS.

BACKGROUND AND SUMMARY

Advantages of optical sensors in harsh environments containing high voltages, high electromagnetic interference (EMI), corrosive materials and other degrading components are well known and produce desirable benefits. Several types of optical force sensors and angle sensors exist in the prior art. As one example, a Fabre-Perot (FP) etalon-type sensor can be used for the measurement of pressure. Fabre-Perot sensors are generally phase-sensitive devices. They are often interrogated by specialized spectrometers to prevent their signals from being intensity dependent (and thus vulnerable to intensity noise and attenuation) or limited to the narrow range of one interference fringe. Fabre-Perot fringes can also be counted to obtain information as the measurand changes. If the count is lost, such as during a power failure, the sensors can be re-initiated under known conditions. Multiplexing of FP sensors or sensors can be challenging, usually employing an optical fiber for each sensor selected by an optical switch or an optical splitter. This can sometimes cause increased complexity, for example in feeding the optical signals from multiple sensors through bulkheads with multiple fibers. The construction of such sensors also often relies on precise control of the very small gap between the mirrors.

Other fiber optic pressure sensors use pressure on a diaphragm to influence a body that blocks part of the light in the light path. Such intensity-based optical sensors, including other intrinsic and extrinsic fiber optic sensors, can be subject to interference from other sources of intensity loss, such as in fiber bending, dirt, variable connectorization losses, and optical fouling.

Other methods use fiber Bragg gratings (FBGs) in a pressure sensor. FBGs are strain sensitive, leading to their use as strain and other force-actuated sensors. While many FBGs can be multiplexed easily on a single fiber by several means, when an optical fiber needs to be stretched or compressed it can sometimes be difficult to fix the fiber portions near the FBG in a compact way and without breakage or without the fiber slipping (creeping) though the fixing material under stress. It is well known that such slippage occurs with epoxies and other adhesives, and even metal solders. Attempts to fix and hold the bare fiber with melted glass may result in breakage. FBGs are also temperature sensitive, necessitating the use of temperature compensation. The most sensitivity to strain for FBGs is often in the axial direction. For tensile strain, the measurement is relatively simple to perform if the fiber can be gripped firmly without slippage. For compressive strain, the fiber will be pre-stressed in order to prevent fiber buckling. For long periods of time, this can lead to vulnerability to breakage. In addition, a sensor that employs the stretching of an FBG to measure pressure frequently requires the mechanical translation of a compressive or tensile force in the direction of the fiber diameter into an expansion movement along the fiber axis, which can be difficult to accomplish. FBGs can also be utilized in a bending mode, but creep and wear are difficulties with this method as well.

It is advantageous in exemplary illustrative non-limiting force sensor implementations to include a wavelength dependent structure (WDS) that can either reflect, transmit, diffract or refract all or part of an optical spectrum incident on the WDS and can be dependent on the orientation and/or location of the WDS with respect to an interrogating light beam.

The nature by which the WDS reflects, transmits, diffracts or refracts the spectrum of the interrogating light beam can be one that is non-exclusively wavelength resonant, dispersive or dichroic in any given orientation with respect to said light beam. A WDS based on optical resonance can be termed a "resonant wavelength optical device" structure, which may include optical gratings, planar interference filters or wedged interference filters. More specifically, other WDS can incorporate, but are not limited to, dispersion-based optical structures, such as prisms, dichroic-based structures such as multilayer optical filters or mirrors, and diffraction-based optical structures, such as ruled, stamped, Rugate, Echelle, Littrow, holographic, volume-phase or the like gratings.

Exemplary illustrative non-limiting optical sensor implementations incorporate at least one wavelength-sensitive element that may be constructed on a substrate and further may be attached to at least one more substrate for various specific purposes, creating a wavelength dependent structure (WDS) that reflects or transmits a wavelength-specific spectral feature (as a non-exclusive example, a resonant peak or valley). Further, the orientation of said WDS can be measured in reference to an interrogating light beam direction by means of said wavelength-specific spectral feature. Said orientation can be induced by a force on said WDS in a pre-arranged manner, thereby transducing said force to a wavelength-encoded optical signal. Said wavelength-encoded optical signal may be further translated to an electrical signal by an optical detector and then to a quantitative representation of said force by further electronic circuitry and/or software.

In example non-limiting implementations, said reference direction can be defined by a beam of interrogating light through free space, a lens system, a mirror system, an optical fiber, or a like optical path arrangement. The light reflected or transmitted as a wavelength-specific spectral feature can be returned to an instrument that measures the reflected or transmitted light spectrum and translates the optical spectral feature into the orientation of the WDS by either the same path as the incident interrogating light or by a different path. The instrument can be additionally configured or calibrated to translate or transduce the wavelength-specific spectral feature of the measured wavelength dependent structure into such force that may cause any changes in the orientation of said wavelength dependent structure. Such forces can non-exclusively include pressure, vibration, fluid flow, magnetic field, electric field, direct mechanical force, displacement, inclination (tilt), acceleration, weight, strain and/or load force. A sensor apparatus may employ as non-exclusive examples levers, pivots, bearings, flexure hinges and linkages, diaphragms, bellows, fluid transmission of said force, magnetostrictive, electrostrictive or other known means to influence the orientation of said wavelength dependent structure. Said sensor apparatus may incorporate multiple measurements and may include temperature compensation by either mechanical design or an independent temperature sensor.

The attributes of subject novel non-limiting sensors include adaptability, wavelength encoded signals, separation of the force-sensitive element from the fiber to avoid strain-temperature cross sensitivity (as with FBGs), and retention of optical sensors' well-known insensitivity to high voltages, electromagnetic interference (EMI), corrosion and other benefits.

One example non-limiting implementation provides an optical sensor for use with a light source providing an interrogating light beam that illuminates a wavelength dependent structure which in turn produces a wavelength-specific spectral feature in conjunction with said light source, said sensor comprising a wavelength dependent structure attached to or incorporated into a mechanism the orientation of which can be made to change in relation to the interrogating light beam by the application of a force, the wavelength dependent structure possessing an optical property that changes the spectral content of transmitted, reflected or refracted light with respect to orientation; at least one optical detector; and at least one return optical path that carries said at least one wavelength-specific spectral feature to the at least one optical detector, said wavelength dependent structure in use being moved in orientation with respect to the light beam by an applied force, thereby causing a shift of spectral content of said wavelength-specific spectral feature, wherein said shift in spectral content is utilized to translate said applied force to a physically meaningful parameter by means of sensor mechanical design, the interrogating light beam, an optical detector and additional electronic circuitry and software.

Said incident light beam may possess a broad spectral band and said optical detector may comprise a wavelength-sensitive optical detector.

The light source may comprise a swept wavelength laser and said optical detector may comprise a simple photodiode detector.

Said interrogating light beam in conjunction with said optical detector and WDS may be structured to use said shift in spectral content to translate said applied force to a physically meaningful parameter.

A non-limiting example sensor of an exemplary illustrative non-limiting implementation may further include means for providing temperature compensation. Said temperature compensation means may include at least one of a mechanical compensation means and an optical temperature sensor mounted in a strain-free manner independent of the force to be measured. Said optical temperature sensor may non-exclusively include one or more of a fiber Bragg grating and a Fabre-Perot sensor; a semiconductor bandgap optical temperature sensor, a fluorescent time decay temperature sensor or a WDS.

The sensor may include a calibrating component that calibrates the spectral changes of the wavelength-dependent device to the applied force.

The wavelength-sensitive element component of a wavelength dependent structure (WDS) may non-exclusively be selected from the group consisting of a ruled grating, a Littrow grating, a volume phase grating, a holographic grating, a Rugate filter or mirror, a photonic crystal, a planar Bragg mirror, a Bragg mirror incorporating multiple mirrors with phase shift cavities between them, a Bragg transmission filter, a linear variable filter, a non-linear variable filter, and combinations thereof.

A detector may be comprised, as non-limiting examples, of at least one of a spectrometer, a wavelength sensitive detector or a wavelength sensitive interferometer; a position-sensitive detector, and the detector may further include as a non-limiting example a linear variable filter coupled to any of a position-sensitive detector; a double photodiode or array of more than two photodiodes; a charge-coupled device; or a complementary metal-oxide-semiconductor device.

A light source may be selected from the group consisting of at least one of a broad spectrum non-coherent source, a light emitting diode, an amplified fluorescent stimulated source, an amplified semiconductor simulated source or a coherent laser beam from a variable wavelength laser.

A wavelength dependent structure may be arranged to change its orientation in response to an applied magnetic field.

A non-limiting example magnetic field sensor may further include at least one magnetic field-sensitive component comprised of at least one magnetostrictive element coupled to a wavelength dependent structure and in addition may include at least one electric current conductor for the purpose of providing an electric current sensor.

The wavelength dependent structure may be structured to change its orientation in response to an applied electric field.

A non-limiting example electric field sensor may be comprised of at least one piezoelectric element coupled to a wavelength dependent structure. Said piezoelectric element further can be composed of a single material, single layers, cascaded layers of the same material or layers of different materials, and force is provided by an electric field acting on said piezoelectric element to cause physical expansion or contraction and thus movement of the wavelength dependent structure.

A non-limiting example force sensor may be comprised of at least one force-transmitting component coupled to a wavelength dependent structure and further may be responsive to at least one or more types of force, including but not limited to mechanical load, gravitational force, change of momentum, fluid pressure, vibration, torque, temperature-induced expansion, acceleration, stress, or centrifugal force.

A non-limiting example rotational speed and position sensor may be comprised of at least one WDS coupled to a rotating element.

An interrogating light beam amplitude may be modulated in time.

The sensor may further include means for calibrating the spectral changes of the wavelength-dependent structure to the applied force.

A non-limiting example sensor may further include a WDS comprised of at least one wavelength sensitive element possessing a linearly graded optical structure selected from the group: ruled grating, Littrow grating, volume phase grating, holographic grating, photonic crystal, planar Bragg mirror, Bragg mirror incorporating multiple mirrors with phase shift cavities between them, a Bragg transmission filter.

A sensing system employing at least one sensor may further comprise at least one linear variable filter combined with a position-sensitive light detector to provide a wavelength-sensitive detector as a component of the interrogating instrument.

A sensing system employing at least one sensor may further comprise a photodetector in the interrogating instrument that may be selected from at least one of a single photodiode, a bi-cell photodiode, a quad photodiode, an avalanche photodiode, a photoresistor, an array of photodiodes, a charge-coupled device, or a complementary metal-oxide-semiconductor device.

A sensing system employing at least one sensor may comprise at least one light source in the interrogating instrument that may be selected from the group consisting of at least one of a broad spectrum non-coherent source, an amplified stimulated source (fluorescent or semiconductor) and a coherent laser beam from a variable wavelength-laser (tunable or swept wavelength laser).

Other non-limiting example features and advantages include:
ruggedness, compactness, competitive performance, reduced complexity and ease of adaptation to measure a variety of stimuli, while providing a signal that can be optically multiplexed
provide a wavelength-encoded optical signal that is "absolute" in the sense that wavelength changes can be measured very accurately and the signal is not vulnerable to light intensity variations as long as enough light power is preserved to actuate the detector
are wavelength-encoded and thus can be wavelength division multiplexed,
decouple the wavelength-sensitive component from the optical fiber to prevent stress-induced uncertainty and dynamic range limitations (as is common with fiber Bragg gratings, known as FBGs), and
can further be interrogated by a variety of wavelength sensitive means, including, as non-limiting examples, swept wavelength lasers combined with simple photo-detectors and/or broadband light sources combined with wavelength-sensitive detectors.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 1 is a schematic and functional diagram of an example non-limiting optical force transducer using interrogation of, as a non-exclusive example, a Littrow grating on a substrate rotated by the application of a force;

FIG. 2a is a graph of an example non-limiting resonant wavelength peak;

FIG. 2b is a graph of an example non-limiting resonant wavelength valley;

FIG. 2c shows example non-limiting data recorded on an optical spectrum analyzer (OSA) for the shift of the resonant wavelength peak due to a 0.557 degree rotation of said Littrow grating taken with the apparatus shown schematically in FIG. 2a;

FIG. 3a is a schematic illustration of an example non-limiting sensor system utilizing WDS sensors designed to produce wavelength-multiplexed signals from the rectilinear motion of multiple reflective WDS for the same or different measurands;

FIG. 3b is a schematic illustration of an example non-limiting sensor system utilizing WDS sensors designed to produce wavelength multiplexed signals from the rectilinear motion of multiple transmissive WDS for the same or different measurands;

FIG. 4a is a schematic illustration of an example non-limiting sensor system utilizing WDS sensors designed to produce wavelength multiplexed signals from the rotational motion of multiple reflective sensors for the same or different measurands;

FIG. 4b is a schematic illustration of an example non-limiting sensor system utilizing WDS sensors designed to produce wavelength multiplexed signals from the rotational motion of multiple transmissive sensors for the same or different measurands;

FIG. 5 is an illustration of an example non-limiting force or pressure sensor employing a first rotational WDS that is activated by a stimulus and further employing a fixed WDS acting as a temperature compensator;

FIG. 6 shows an example non-limiting inclinometer or tilt meter employing a rotational WDS; a single axis only is shown for clarity, but optionally two or three axes can be packaged in the same casing;

FIG. 7 is an illustration of an example non-limiting accelerometer employing a WDS designed for rotation; a single axis only is shown for clarity, but optionally two or three axes can be packaged in the same casing;

FIG. 8 illustrates an example non-limiting strain sensor employing a rotational WDS and further attached to a beam that is strained by force F;

FIG. 9 illustrates an example non-limiting load sensor employing an anvil to which a load force F is applied which in turn rotates a WDS by means of a linkage;

FIG. 10 illustrates an example non-limiting force or pressure sensor employing a WDS fabricated on a thin diaphragm in which the signal is produced by the bending of the diaphragm under the stimulus of the force F;

FIG. 11 illustrates an example non-limiting torque sensor employing a WDS designed for rectilinear motion with respect to the interrogating light beam in which the signal is produced by the twisting of a shaft or other structural member;

FIG. 12 is an illustration of an example non-limiting torque sensor employing a WDS designed for rotary motion of the WDS in which the signal is produced by the twisting of a shaft or other structural member;

FIG. 13a is an illustration of an example non-limiting voltage or electric field sensor employing a WDS designed for rotary motion in which the signal is produced by the deflection of a beam-shaped piezoelectric element actuated by said applied voltage or electric field;

FIG. 13b is an illustration of an example non-limiting voltage or electric field sensor employing a WDS designed for rotary motion in which the signal is produced by the deflection of a round diaphragm piezoelectric element actuated by said applied voltage or electric field (components are left out for clarity, refer to FIG. 13a);

FIG. 14 is an illustration of an example non-limiting electric current or magnetic field sensor employing a WDS designed for rotary motion in which the signal is produced by the deflection of a magnetostrictive element actuated by said applied current or magnetic field;

FIGS. 15a and 15b are respectively end and side view illustrations of an example non-limiting rotary speed and position sensor, employing a WDS designed with a graded optical structure and applied to a drum for rotary motion in which the signal is produced by the position of the drum with respect to the optical beam at the edge of the drum;

FIGS. 16a, 16b are respectively end and side view illustrations of an example non-limiting rotary speed and position sensor, employing a WDS designed with a graded optical structure and applied to a disk or drum for rotary motion in which the signal is produced by the position of the disk with respect to the optical beam at the end face of the ring; and FIG. 17 is an illustration of an example non-limiting force or pressure sensor employed as a simple optical, wavelength encoded, explosion-proof switch including a rotational WDS that can be activated by force F from a person's finger or some other source. Proof of light path continuity may optionally be provided.

DETAILED DESCRIPTION

Non-Limiting Introduction to Example Concepts and Arrangements

Because of the global power of the sensors and methods disclosed herein to measure many different measurands via the translation of applied forces from many different physical stimuli, combined with several methods of obtaining wavelength-encodable optical signals, it is advantageous to give the following non-limiting explanations of descriptive words, terms and concepts:

Fictitious Force: as Non-Limiting Examples, Centrifugal Force(s) and Change in Momentum Wavelength-encoded signals: Signals from a single sensor can be assigned to a particular wavelength band over its wavelength range of operation. Different sensors can then be connected together, either in a single optical path (optically in series) or in different optical paths through an optical splitter (optically in parallel) or a combination of such paths. This method is sometimes also known as wavelength-division-multiplexing, or WDM.

Wavelength-dependent spectral feature: a narrow or broadband specific spectral shape located at a particular wavelength such that said wavelength can be determined accurately and changes in the feature spectral position can also be measured accurately. The specific spectral shape can include, but is not limited to, a peak, notch, crest, valley, or combinations thereof in optical intensity versus wavelength, and said spectral shape and spectral position can be jointly defined as spectral content.

Wavelength-sensitive element: An optical element exhibiting a wavelength-dependent spectral feature. Said element may be designed to be optically functional, as non-limiting examples for this description, by producing spectral content changes when changed in physical orientation and/or alignment with an incident light beam.

Wavelength Dependent Structure (WDS): A structure comprising at least one wavelength-sensitive element and optionally other components that may not be optical in nature, such as supports and the like or optical components performing a complimentary function, such as mirrors and anti-reflection coatings.

Orientation and Alignment and changes therein: The rotational and translational relationship of a WDS to the direction of an incident light beam produces a wavelength-dependent spectral feature that is characteristic of its particular design. Further, changes to that relationship due to a force applied by a particular stimulus to said WDS produces changes in said wavelength-dependent spectral feature that can be resolved and quantified by an interrogation instrument. In this description of an exemplary illustrative non-limiting implementation, the non-limiting term "orientation" will be used to specify either or both rotational and translational position and motion of a WDS with respect to the direction of an interrogating light beam.

Interrogating or incident light beam: A coherent or non-coherent light beam incident on a WDS. Said light beam may be produced in an instrument purpose-built to interrogate a particular sensor containing said WDS, or in a non-limiting way may come from an independent source. "Interrogating" and "incident" are interchangeable terms with respect to light beams in the present description of an exemplary illustrative non-limiting implementation. As non-limiting examples, light beams can be contained in an optical waveguide (e.g., optical fiber), a liquid or in free space (e.g., a vacuum or gas).

Sensor system: Each embodiment of a non-limiting example of an optical sensor containing a WDS may be used in conjunction with an interrogation instrument to translate the optical signal from said WDS to a physically meaningful measurand, comprising said system. The interrogation instrument may purposefully provide an interrogating light beam, a detector designed to translate the optical signal to, as a non-limiting example, an electrical signal, and further electronic circuitry and software to produce a measure of a physical stimulus. Additionally, said system may include multiple sensors, optical fiber connections, circulators, splitters, couplers and other components.

Non-Limiting Wavelength-Sensitive Elements:

Bragg Structure: A structure made up of alternating layers of materials with different indices of refraction that are transparent in some wavelength range, and the thickness and indices of refraction of which are chosen to constructively interfere reflected light in at least one wavelength band within said range while causing little effect in the wavelength bands adjacent to the reflected range or band, in which adjacent bands substantial transmission occurs. A Bragg mirror or filter can be in planar form, such as a conventional bandpass filter, or it can be formed in a fiber with a laser, which is conventionally termed a fiber Bragg grating, or FBG, of which several types are known in the art. A design conversely can be executed that transmits only a certain band of wavelengths and reflects the remainder.

Cavity in a Wavelength-sensitive Element: Non-exclusively, a free space or solid material gap within a wavelength-sensitive element to improve or make possible the functionality of said element. As a non-limiting example, a layer of a material that is transparent in a wavelength range, the thickness of which is chosen to yield a phase shift of the light passing though it of an integral fraction or an integral multiple of pi. When said cavity is placed between two Bragg mirrors, the passed or reflected band is narrowed and the degree of transmission or reflection is increased. Multiple cavities, each between Bragg structures, can be utilized in more complex optical structures. The pass band center wavelength of these structures is dependent upon the angle of the incident light because the effective thickness of the layers changes with angle. A non-limiting example of free space cavity could include the gap between mirrors in a Fabre-Perot etalon.

Interference Filter or Mirror: An optical device, usually made up of at least two Bragg structures and at least one cavity, designed to transmit or reflect a wavelength band of light and to reflect or transmit, respectively, the majority of the light outside that band.

Wedged Filter or Mirror (i.e., a wedge filter or mirror): A multilayer interference device made up of at least two Bragg structures with at least one cavity between them, either the cavity alone or the cavity and Bragg structures varying in thickness with distance along the substrate. The cavity and Bragg structure thicknesses can vary nonlinearly or linearly and can vary in two orthogonal directions. In addition, the Bragg mirror layers can vary in thickness at either the same or different rates as the cavities.

Linear Variable Filter (LVF): The special case of the wedged filter in which the mirror or filter layers vary linearly with distance parallel to the plane of the substrate. The thicknesses of the layers can vary in one or two directions, but most commonly in one direction.

Ruled Grating: A ruled grating is one that is made by machining parallel grooves into a substrate, such as quartz, by means of diamond tools or by photolithography followed by an etching process such as reactive ion or chemical etching and/or a variety of other techniques.

Littrow Grating: A ruled, two dimensional grating with parallel grooves and ridges that ideally have an approximately triangular cross section, with the angle of the faces such that the angle of maximum reflection equals the angle of refraction and is normal to one face of the triangle. The gratings can be machined, formed with lithographic techniques or stamped in a polymer with a micro- or nano-molding technique.

Planar Holographic Grating: A grating made with a photographic technique in which the grating features are made by the interference of two light beams of the same wavelength. Lithography can be employed with an etching technique to form high aspect ratio features if desired, or the pattern can remain in a photosensitive medium.

Volume Phase Grating: A holographic grating in which the interference pattern is induced in an optically thick photosensitive medium. For a volume phase grating, the typical thickness for the diffractive medium ranges from a few to tens of micrometers in the direction normal to the large plane of the grating.

Photonic Crystal: A two or three dimensional periodic dielectric structure designed to prevent the passage of certain wavelengths, forming an 'optical bandgap' analogous to a semiconductor bandgap.

Surface Plasmon Resonance: An interaction between the electric vector of a light beam and the conduction electrons of a metal that creates an excited electronic state analogous to gaseous plasma. For a given angle of incidence, there is a resonant peak at a particular wavelength in the transmission spectrum. This peak wavelength, or the angle at which it occurs, is frequently used for sensing of various substances because it is also sensitive to the index of refraction of any substances in contact with the metal.

Rugate Filter or Rugate Mirror: A Rugate filter or mirror is a multilayer device in which the index of refraction variation is sinusoidal instead of alternating with sharp interfaces, as in standard interference filters or mirrors. The period and amplitude of the sinusoid can be varied within a single structure.

Fabre-Perot Etalon or Filter: Two plane-opposed mirrors, one or both of which could be semitransparent and/or movable with respect to the other.

Non-Exclusive Descriptions of Optical Detectors:

Photodetector: Non-exclusively a semiconductor photodiode, CMOS array, CCD array, photodiode array, a photoresistor, a pyroelectric detector, a bolometer or a thermopile.

Photodiode or phototransistor: A bipolar (PD) or tri-polar (TD), respectively, semiconductor device that has light sensitive electrical properties in some spectral range.

Charge Coupled Devices (CCD): A capacitive circuit element developed primarily for electrical memory elements but that can also be made light sensitive. CCDs are easily made into linear or two dimensional arrays.

Complementary Metal Oxide Semiconductor Devices (CMOS): These are light sensitive circuit elements of self-explanatory construction and can also include the read-out electronics made by the same general technology. CMOS elements are easily made into linear or two dimensional arrays.

Position Sensitive Photodiode (PSP): A photodiode made with two or more semi-independent segments close together with each segment having one independent electrical contact and one in common with the other segment. For example, diodes with four segments (quad diodes) are commonly used for measuring the position of a body via a laser beam reflected from said body depending on the apportionment of the incident light beam among segments. A second type of position sensitive photodiode uses only one continuous light responsive surface, but at least two top electrical contacts are positioned at opposite edges with a common connection on the side opposite the light sensitive surface. This latter type will be termed a PSD, and the segmented variety may be termed a bi-cell, quad-cell or PD array.

Non-Exclusive Descriptions of Optical Sensor Interrogation Devices and Methods:

Swept wavelength laser: A laser the output wavelength of which can be caused to vary continuously through a spectral band. When the laser output spectral band sweeps past a WDS spectral band, the laser light is reflected or transmitted in wavelengths characteristic of the WDS and diverted to a detector for processing into an electrical representation of the spectral feature. The detected wavelength characteristic may depend upon the orientation of the WDS to the laser beam. The interrogation signal from this type of laser can be viewed as time-varying, although it is not amplitude-modulated.

Wavelength Sensitive Detector: One non-limiting example of this type of detector consists of a wedged filter, preferably a LVF, positioned in front of a position-sensitive photodiode such as a bi-cell, quad-cell, an array or a linear PSD. This combination forms an inexpensive but very high spectral resolution detector for narrow band spectra, as a non-exclusive example, a reflection peak from an FBG. As the wavelength incident on the LVF changes, the location of the light spot getting though the LVF to the PSP/PSD changes position and the wavelength is thus converted to an electrical signal. Only the wavelength of a peak or valley of, respectively, as a non-exclusive example, a reflected or transmitted FBG spectrum is detectable by said defined position-sensitive photodiodes. An array of detectors could provide more spectral intensity data.

Wavelength Sensitive Interferometer: This type of interrogator is non-exclusively comprised of a tunable interferometer, as a non-exclusive example made with an electro-optical material such as lithium niobate, in combination with an optical detector. Similarly, it could be composed of a piezo-electrically-driven Fabre-Perot etalon in combination with an optical detector.

Spectrometer: These interrogation devices convert the spectral content of light into an electrical signal by one or more of several means. Such devices can non-exclusively include many combinations of wavelength resonant filters, wedge filters, gratings, prisms and single or array photodetectors. Comb or edge filter: This interrogation technique converts the spectral content of input light to an electrical signal via a photodetector as spectral content changes in superposition with the filter spectral characteristics.

Exemplary Non-Limiting Optical Force Sensor Illustrations

FIG. 1 will aid in the general specification description. It outlines a non-limiting configuration example incorporating a reflective Wavelength Dependent Structure (WDS) (113), composed in this case of a wavelength-sensitive element (112) (as a non-exclusive example, a Littrow grating) attached to a support (101). A light source (104) emits coherent or non-coherent light of some spectral shape into a fiber optic cable (105) which may transmit either single mode or multimode light. The light is transmitted to a directive device (106) such as a coupler, splitter, circulator, or the like and steered to another fiber optic cable (107). The light then transmits through a beam shaping device (108) such as a collimating lens or any other optical device that can direct, transmit and collect sufficient light. The light is emitted through a transmissive medium (109), which could consist of vacuum, air, or a different desired material. The light of desired beam shape is directed toward reflective WDS (113) that may in-turn be fabricated in, or fixed to, a further supportive mechanism, flexure hinge, pivot or the like.

FIGS. 2a and 2b illustrate non-limiting examples of resonant wavelength optical responses of optical power vs. wavelength and their wavelength changes as may be caused by a stimulus through the motion of a WDS 113. FIG. 2a is a schematic diagram of a non-limiting example resonant wavelength peak, the peak position in wavelength of which can be made to change in response to a stimulus, and further the peak position of which is accurately and unambiguously measureable. FIG. 2b is a schematic diagram of a non-limiting example resonant wavelength valley, the valley position in wavelength of which can be made to change in response to a stimulus, and further the valley position of which is accurately and unambiguously measureable. Reference numeral 1 refers to a reflection peak from WDS. Numeral 2 refers to a change in peak wavelength position that constitutes the signal in response to a stimulus. Numeral 3 refers to a full width at half maximum power (FWHM) for a peak. Numeral 4 refers to a transmitted valley of said example WDS. Numeral 5 refers to a change in valley minimum wavelength that constitutes the signal in response to a stimulus. Numeral 6 refers to a spectral width at half minimum power (FWHM) for a valley.

The WDS (113) thus reflects the light back toward the beam shaping optics (108) such that only light with a particular wavelength spectrum will re-enter the fiber (107), the spectral (wavelength) content of said spectrum being dependent upon the orientation of said WDS with respect to the light path (107). The particular wavelength band of light that re-enters the fiber is dependent on the physical parameters of the wavelength-sensitive element (112), including the incident orientation (102) of the light onto the face of the WDS that is governed by the construction of the mechanical parts of the sensor and the force measurand. The light that re-enters the fiber (107) passes through the directive device (106) and is steered through the fiber (110) toward a wavelength-sensitive detector (111). The variety of measurands addressable by this method will become more apparent in the subsequent descriptions of the drawings.

The non-limiting example configuration shown in FIG. 1 is not limited to fiber optic components and can be substituted all or in part by suitable free-space components or other optical waveguides. In this regard, the fiber optic directive device (106) could be replaced with, for instance, a polarizer or a prism-type beam splitter. In addition, it is important to note that the particular schematic diagram in FIG. 1 utilizes a reflective type WDS. However, it is possible to incorporate a transmissive WDS and perform the same function by reorienting the beam path to the detector (111) on the opposite side of the WDS (101). Also, for this method of measuring wavelength in response to a force stimulus, the optical source type is not limited to those that are continuous, broadband, comb, tunable or coherent.

FIG. 2c shows example non-limiting data recorded on an optical spectrum analyzer (OSA) for the shift of the resonant wavelength peak due to a 0.557 degree rotation of a WDS comprising a Littrow grating. This data was taken with the apparatus shown schematically in FIG. 1. FIG. 2c illustrates the positions of two resonant wavelength peaks at the extreme ranges of the broadband light source that was utilized. A first angle setting of a Littrow grating caused a reflection spectral band with a peak center wavelength of 1537.362 nm to reenter the collimator. A force was then applied, causing the grating to be rotated 0.557° from the first angle, which swept the wavelength of the reflected light monotonically to a peak position of 1596.037 nm. The calculated angular resolution of this system was $(0.557°/(1596.037 \text{ nm}-1537.362 \text{ nm})=9.493\times10^{-3}$ degrees/nm. Therefore, a sensor based on this method can provide an angular resolution of 9.5 microdegrees when used in conjunction with a broadband light source and a wavelength sensitive detector or a tunable laser with picometer resolution.

Additional Detailed Example Non-Limiting Illustrations—Change in WDS Orientation By Means of Rectilinear Motion FIG. 3a is a schematic illustration of an example non-limiting sensor system utilizing WDS designed to produce wavelength-multiplexed signals from the rectilinear motion of multiple reflective WDS stimulated by the same or different measurands.

FIG. 3b is an example non-limiting schematic illustration of a sensor system utilizing WDS sensors designed to produce wavelength multiplexed signals from the rectilinear motion of multiple transmissive WDS for the same or different measurands.

FIGS. 3a, 3b show schematic illustrations of methods of interrogation of the WDS sensors and multiplexing of WDS sensors designed for rectilinear motion of the WDS, interrogating light comprising and optical spectrum from light source 201 (301) is transmitted by optical fiber 202 (302) through a sensor casing 213 (313) via a feedthrough 204 (304) that may contain optical conditioning components such as lenses, from which said light interacts with WDS 206 (306) that can be translated in at least directions 208 (308) by a force stimulus. In the case of FIG. 3a, for a reflective WDS, a light directive device 212 is employed to multiplex at least one additional WDS 206a via at least one additional fiber 202. The light is returned through coupling fibers 202, 202a and an additional light directive device 203 that may be a circulator or coupler to a detector 210 communicating with an electronics device 211. In the case of FIG. 3b, for a transmissive WDS, the light transmitted through the WDS and containing the data from the WDS 306 continues through the free space path 305, though another feedthrough 304' to a second sensor with feedthrough 304a, and free space optical path 305a to at least one more WDS 306a. Optical information from all sensors in the series is transmitted through fiber 309 to detector 310 communicating with the electronic instrument 311.

Example Non-Limiting Illustrations—Change in WDS Orientation by Means of Rotational Motion FIG. 4a is a schematic illustration of an example non-limiting sensor system utilizing WDS sensors designed to produce wavelength multiplexed signals from the rotational motion of multiple reflective sensors stimulated by the same or different measurands.

FIG. 4b is a schematic illustration of an example non-limiting sensor system utilizing WDS sensors designed to produce wavelength multiplexed signals from the rotational motion of multiple transmissive sensors for the same or different measurands.

FIGS. 4a, 4b illustrate interrogation methods and multiplexing of WDS sensors designed for rotational motion of the WDS. Interrogating light comprising an optical spectrum from light source 401 (501) is transmitted by optical fiber 402 (502) through a sensor casing 413 (513) via a feedthrough 404 (504) that may contain optical conditioning components such as lenses, from which said light interacts with WDS 406 (506) that can be rotated in at least directions 408 (508) by a force stimulus. In the case of FIG. 4a, for a reflective WDS, a light directive device 412, as a non-limiting example, an optical splitter, is employed to multiplex at least one additional WDS 406a via at least one additional fiber 402a. The light is returned through coupling fibers 402, 402a and an additional light directive device 403 that may be a circulator or coupler to a detector 410 communicating with an electronics device 411. In the case of FIG. 4b, for a transmissive WDS, the light transmitted through the WDS and containing the data from the WDS 506 continues through the free space path, 505, though exit feedthrough, 504 to the entrance feedthrough of the next sensor, 504a, and free space optical path 505a to at least one more WDS 506a, etc. All information from the series of sensors it returned through fiber 509 to the detector 510 communicating with electronics device 511.

Non-Limiting Example: Pressure Sensor with Temperature Compensation

FIG. 5 illustrates an example non-limiting force or pressure sensor employing a first rotational WDS that is activated by a stimulus and further employing a second, fixed WDS acting as a temperature compensator.

FIG. 5 shows a force sensor, as a non-exclusive example a pressure sensor, comprised of a sealed enclosure or casing 601 employing an asymmetric flexible structure with a mechanically stiffer part 602 of a mechanically less stiff flexible joint 603. A rotational WDS 604 is thus moved in an arc by force stimulus 605 through an angle 606. At least a second WDS 607 is employed in a manner unaffected by force 605 in order to provide temperature compensation, or alternately the temperature compensation sensor could be a fiber Bragg grating within the same fiber 611 or a Fabre-Perot sensor in fiber 612. Temperature compensation may also be provided by proper mechanical design to restrain temperature changes from inducing rotation of WDS 604. WDS 604 is connected by the free space light path 608 and the collimating lens 609 to the optical fiber 611 that transmits both the excitation beam and the signal beam. WDS 607 is similarly connected through collimating lens 610 to fiber 612. If the two WDS are designed with different wavelength-dependent spectra, they can be multiplexed on the same fiber.

Non-Limiting Example: Tilt Sensor or Inclinometer

FIG. 6 illustrates an example non-limiting inclinometer or tilt sensor employing a rotational WDS. A single axis only is shown for clarity, but optionally two or three axes can be packaged in the same casing.

FIG. 6 shows an inclinometer or tilt sensor comprised of a sealed casing 702 mounted on a base 703, which is in turn fixed to a surface 701, the inclination angle 704 of which is to be measured. The inclination 704 is reflected in the change of orientation 705 of the WDS 708. A mounting 707 for the WDS 708 can be provided to accommodate the pivots 709, which can optionally be jeweled bearings, a flexure hinge or other bearing type. The casing 702 can be filled with optically compatible oil or other fluid 706 to provide damping, and stops 713 can be provided to limit the motion of the WDS. An additional proof mass 714 can also be provided. The optical excitation and signal light travels across the free space path 715, said signal not being limited by a small degree of absorption in the fluid 706 because of the wavelength-encoded nature of the signal. A collimating lens 710 can be provided to make more efficient use of the interrogating light from the optical fiber 712 and to also make the accelerometer less susceptible to temperature fluctuations. The feedthrough seal 711 can be provided for one or both of the lens housing or the fiber 712 itself. Non-Limiting Example: Accelerometer Non-Limiting Example—Accelerometer FIG. 7 shows an example non-limiting accelerometer employing a WDS designed for rotation. A single axis only is shown for clarity, but optionally two or three axes can be packaged in the same casing.

The FIG. 7 accelerometer is comprised of a sealed casing 801 on a base 802 that can be affixed to a wavelength dependent structure the acceleration of which is to be measured. A support 803 can be provided for a flexure hinge 804 connecting a rotational WDS 806 with optional attached proof mass 811. Stops 805 can be provided to limit the motion of the WDS through its angle of travel 810. A collimating lens 807 can be employed to make the use of the interrogating light from fiber 809 along the free space optical path 812 more efficient and to also make the accelerometer less susceptible to temperature fluctuations. A seal 808 can be provided for the fiber or the lens casing. The casing can be filled with an optically compatible fluid (not shown) to provide damping and/or thermal uniformity. A second, fixed WDS, fiber Bragg grating or other like temperature compensation sensor can optionally be provided.

Non-Limiting Example—Strain Sensor

FIG. 8 shows an example non-limiting strain sensor or extensometer employing a rotational WDS and further attached to a beam that is strained by force F. A strain sensor is illustrated, comprised of a sealed casing 901 on a base 902 that can be affixed to a body 904 the strain in which is to be measured. A weld or other attachment 903 can be provided to the object 904 to prevent slippage. A stiffening member 905 can be provided to promote the rotation of the WDS 906 and to allow the casing 901 to properly flex in directions 907. A collimating lens 909 can be employed to make the use of the interrogating light from fiber 910 along the free space optical path 908 more efficient and to also make the strain sensor less susceptible to temperature fluctuations. A seal 911 can be provided for the fiber or the lens casing. The casing can be filled with an optically compatible fluid (not shown) to provide damping and/or thermal uniformity, and a second, strain free WDS or other optical sensor, such as a fiber Bragg grating or Fabre-Perot sensor can optionally be provided for temperature compensation. The dimensions d and l can be chosen to optimize the mechanical design to obtain the desired signal from the WDS.

Non-Limiting Example—Load Sensor

FIG. 9 shows an example non-limiting load sensor employing an anvil to which a load force F is applied to rotate a WDS by means of a linkage.

The FIG. 9 load sensor is comprised of a sealed casing 1001 with a flexible portion 1002. An anvil 1003 is designed to provide the required mechanical stiffness for the load range F desired. A flexure hinge 1004 connects the WDS 1005 to the stressed member 1003 and an unstressed reference member in such a way as to promote the rotation 1006 of the WDS under load. A collimating lens 1008 can be employed to make the use of the interrogating light from fiber 1010 along the free space optical path 1007 more efficient and to also make the load sensor less susceptible to temperature fluctuations. A seal 1009 can be provided for the fiber or the lens casing. The casing can be filled with an optically compatible fluid (not shown) to provide damping and/or thermal uniformity, and a second, strain free WDS or other optical sensor, such as a fiber Bragg grating or Fabre-Perot sensor can optionally be provided for temperature compensation.

Non-Limiting Example—Diaphragm Pressure Sensor

FIG. 10 illustrates an example non-limiting force or pressure sensor employing a WDS fabricated on a thin diaphragm in which the signal is produced by the bending of the diaphragm under the stimulus of the force F. In the non-limiting example of the wavelength-sensitive element, of the WDS being an optical grating, the pitch of optical grating is caused to change, producing a change in its wavelength-specific spectral feature Further, the wavelength-sensitive element can be place off-center with respect to the center of the mechanical center of deflection of the diaphragm.

In FIG. 10, a force sensor, as a non-exclusive example a pressure sensor, is comprised of an enclosure or casing 1105 sealed to the cladding 1101 of an optical fiber at its distal end. The interrogating and signal light beams follow the same path in the fiber core 1102. The WDS 1104 is sealed to the casing 1105 by joint 1108 and responds to the stimulus force F by changing its optical dimensions (1109 to 1109a) due to its bend radius as shown in the expanded view 1104a. The spacing from the end of the fiber to the WDS is not critical as it is in a Fabre-Perot sensor of similar construction. Temperature compensation may be provided by a fiber Bragg grating 1110 incorporated into the fiber core near the end and having a spectral band distinct from that of the WDS and the two can be multiplexed by the same instrument. The WDS itself can optionally be made in a circular configuration for bending symmetry. An FBG 1110 in the same fiber near the WDS can be employed for temperature compensation by employing a different wavelength response band from that of the WDS.

Non-Limiting Example—Torque Sensor Utilizing Changes in WDS Orientation by Means of Rectilinear Motion FIG. 11 illustrates an example non-limiting torque sensor employing a WDS designed for rectilinear motion with respect to the interrogating light beam in which the actuating force is produced by the twisting of a shaft or other structural member.

FIG. 11 illustrates a torque sensor, shown as a non-exclusive example mounted to a round shaft 1101 that can rotate in either direction 1202 in bearings 1214, is comprised of two supports 1203, 1206, for the optical components that are independently fastened to the shaft by collars 1204, 1205. Elastic or deformable seals 1207, 1212 can protect the free space optical path from contamination and allow the two supports 1203, 1206, to rotate independently of each other. By placing the light beam from the fiber 1210 through the fiber end or alternately, a collimating lens 1209 in the center of the WDS 1208 at zero torque, the torque in either direction of shaft rotation can be measured in a sign-sensitive manner by the rectilinear orientation changes of the WDS with respect to the interrogating beam. The exciting and signal beams are transmitted through the path of the fixed fiber 1215, the rotating joint 1213 and the fiber 1210 that rotates with the shaft. Alternatively, the optical signal can be converted to digital electronic data and be transmitted wirelessly to a non-rotating receiver.

Non-Limiting Example: Torque Sensor Utilizing Changes in WDS Orientation by Means of Rotary Motion FIG. 12 illustrates an example non-limiting torque sensor employing a WDS designed for rotary motion of the WDS in which the signal is produced by the twisting of a shaft or other structural member.

The FIG. 12 torque sensor, shown as a non-exclusive example mounted to a round shaft 1301 that can rotate in either direction 1302, is comprised of two supports 1303, 1304, for the optical components that are independently fastened to the shaft by collars 1305. The WDS 1308, mounted by a flexure hinge 1310, is shown in a view with the line of the diameter of the shaft through the WDS being normal to the page and parallel to the axis of rotation of the WDS. In other words, if as a non-exclusive illustrative example the WDS is a Littrow grating, the rulings of the grating would also be normal to the page in this illustration. Elastic or deformable seals 1307, 1313 can protect the free space optical path 1311 from contamination and allow the two supports 1303, 1304, to rotate independently of each other as illustrated by the arrows 1306. By placing the light beam from the fiber 1314 through the fiber end or collimating lens 1309 in the center of the WDS 1308 at zero torque, the torque in either direction of rotation can be measured in a sign-sensitive manner through the WDS motion 1312. The exciting and signal beams are transmitted through the fixed fiber 1316 and the rotating joint 1315 to the fiber 1314 that rotates with the shaft. A fluid 1317 can be utilized to dampen vibrations. The torque sensor is shown at 90 degrees from that in FIG. 11 in order to better show the angular motion of the WDS, but it is intended that the WDS and flexure hinge be contained between seals 1307 and 1313.

Non-Limiting Example: Electric Field Sensor Utilizing Changes in WDS Orientation by Means of Rotary Motion Sensor FIGS. 13a, 13b show an example non-limiting voltage or electric field sensor employing a WDS designed for rotary motion in which the signal is produced by the deflection of a piezoelectric element actuated by said applied voltage or electric field. FIG. 13a shows a beam-shaped piezoelectric actuator, and FIG. 13b shows a round diaphragm piezoelectric actuator with some of the components removed for clarity (refer to FIG. 13a).

FIGS. 13a, 13b show an optical sensor that convert an applied voltage V or electric field E into a wavelength encoded optical signal with sign sensitivity. The piezoelectric actuator 1405 (1405a), enclosed in a casing 1401 and affixed to a mount 1406, can be for instance a bimorph rod that is composed of at least two different materials bonded together. The piezoelectric actuator could also be, as another non-exclusive example, a bimorph disk or Thunder™ actuator 1405a, shown in a simplified drawing in casing 1401a, with the other components being similar to the drawing of the rod-actuated sensor, including the 'diaphragm-like' motion 1408a of WDS 1403a. The voltage can be of either polarity. An ambient applied electric field vector 1414 is shown for simplicity as only one vector component that actuates the piezoelectric element. A lever 1404 can be affixed between the piezoelectric 1405 and rotary WDS 1403 and may be designed to provide enhanced range of motion. The WDS 1403 may be further affixed to a flexure hinge 1402 or may be mounted directly to the piezoelectric element, shown in FIG. 13b as 1403a. The excitation and signal light beams travel through the optical fiber 1413 and free space light path 1410. A collimating lens assembly 1411 can be utilized or the bare end of the fiber, a lens formed of the fiber material or other suitable structure can be utilized. The seal 1412 can, as non-exclusive examples, be applied to a lens assembly, a fiber buffer coating, fiber jacket, or metalized bare glass of the fiber and may be any type suitable for the environment of the intended use.

Non-Limiting Example: Current or Magnetic Field Sensor Utilizing Changes in WDS Orientation by Means of Rotary Motion FIG. 14 illustrates an example non-limiting electric current or magnetic field sensor employing a WDS designed for rotary motion in which the signal is produced by the deflection of a magnetostrictive element actuated by said applied current or magnetic field.

FIG. 14 shows an optical sensor that converts an applied electric current I or magnetic field H into a wavelength-encoded optical signal. The magnetostrictive actuator 1503, enclosed in a casing 1501 and affixed to, for example the casing, can be non-exclusively for instance a Terfenol™ rod. The current can be of either polarity and only the magnetic field vector component that actuates the magnetostrictive element will be detected. The WDS 1502 can be affixed to the magnetostrictive element 1503 by a linkage that may be designed to provide enhanced range of motion 1506. A flexure hinge 1507 can be used to provide friction-free motion.

The excitation and signal light travel through the optical fiber 1508 and free space light path 1505. A collimating lens assembly 1504 can be utilized or the bare end of the fiber, a lens formed of the fiber material or other suitable structure can be utilized. The seal 1509 can be applied nonexclusively to a lens assembly, a fiber buffer coating, fiber jacket, metalized bare glass of the fiber or the bared glass of the fiber and may be any type suitable for the environment of the intended use. In a further alternative configuration, the magnetostrictive actuator can take the form of a bimetal strip or other configuration similar to that in FIG. 13 and be used to activate the WDS directly.

Non-Limiting Example: Shaft Speed and Position Sensor

FIGS. 15a, 15b show an example non-limiting rotary speed and position sensor, employing a WDS designed with a graded optical structure and applied to a drum for attached to a rotating shaft or other body, in which the signal is produced by the position of the drum with respect to the optical beam at the edge of the drum. FIG. 15a shows an end view and FIG. 15b shows a side view.

FIGS. 15a, 15b illustrate an optical sensor that converts rotary motion 1608 (1708) of, for example a shaft 1603 (1703), into a wavelength-encoded optical signal with sign and position sensitivity. The WDS 1606 (1706) can be designed with a preferably linearly varying optical property in, for example the direction 1609 (1708) and can be applied to the drum 1601 (1701) as an appliqué or directly by an appropriate embossing means. The graded WDS can have an abrupt transition from an end wavelength to a starting wavelength at the position 1610 (1710). The WDS may employ a mirror component 1607 (1707). A casing is omitted for clarity, but a sealed casing can be incorporated to protect the optical path 1605 (1705) from contamination, with a rotary seal for the shaft and a mounting and seal for the fiber or collimating lens assembly 1604 (1704). The optical fiber 1602 (1702) transmits both the excitation and signal beams. Temperature compensation can be provided by a fiber Bragg grating in the fiber without interfering with the tachometer signal.

Non-Limiting Example: Shaft Speed and Position Sensor

FIGS. 16a, 16b show an example non-limiting rotary speed and position sensor employing a WDS designed with a graded optical structure and applied to a disk or drum for rotary motion in which the signal is produced by the position of the disk with respect to the optical beam at the end face of the ring. FIG. 16a shows an end view and FIG. 16b shows a side view. FIG. 16a omits the optical components such as fiber and any lenses, because it is an end view.

FIGS. 16a, 16b illustrates an optical sensor that converts rotary motion 1808 (1908) of, for example a shaft 1803 (1903), into a wavelength-encoded optical signal with sign and position sensitivity. The WDS 1806 (1906) can be designed with a preferably linear optical property in, for example, the direction 1809 (1909), and can be applied to the drum 1801 (1901) as an appliqué or directly by an appropriate embossing means. The graded WDS can have an abrupt transition from an end wavelength to a starting wavelength at the position 1810. The WDS may employ a mirror component 1807 (1907). A casing is omitted for clarity, but a sealed casing can be incorporated to protect the optical path 1805 (1905) from contamination, with a rotary seal for the shaft and a mounting and seal for the fiber or collimating lens assembly 1804 (1904). The optical fiber 1802 (1902) transmits both the excitation and signal beams. Temperature compensation can be provided by a fiber Bragg grating in the fiber without interfering with the tachometer signal.

Non-Limiting Example: Explosion-Proof Switch

FIG. 17 illustrates an example non-limiting force or pressure sensor employed as a simple optical, wavelength encoded, explosion-proof switch. A rotational WDS can be activated by force F from a person's finger or some other source.

FIG. 17 shows a sealed casing 2001 housing a rotational WDS 2002 linked by a flexure structure 2003, 2005 to a movable diaphragm 2004. The free space light path 2006 is followed by both the excitation and signal light. The collimating lens assembly 2007 or simply the open fiber end is sealed into the casing 2001 with seal 2008. Optical fiber 2009 conducts both excitation and signal light from the splitter or circulator 2010 to the switch. Light from an inexpensive LED 2011 can be used as the excitation source. The fiber 2013 carries the signal light from the WDS to at least one narrow bandpass filter 2014 that governs the wavelength band allowed to fall on the at least one simple photodiode 2015. The filter 2014 can alternatively be non-exclusively a LVF and the photodiode 2015 can be a PSD. The filter 2014 pass band can be chosen such that, with the diaphragm 2004 in the rest position, the WDS wavelength band coincides with the filter pass band. The LED sends a signal to the electronics block 2017, which is outside the explosion zone and which can operate a relay 2017 or provide some other signal to an operator. When the diaphragm 2004 is pushed, the wavelength bands of the filter and WDS diverge and the signal from the LED stops. A 'normally open' or 'normally closed' function can be arranged. The switching operation can also be reversed, with the pressure on the diaphragm 2004 causing the WDS wavelength band to move to coincide with the filter passband, thus completing the switching function. A dual wavelength indication can also be arranged such that a first wavelength band is present at the detector 2015 in the open switch position and a second wavelength band is present at the detector 2015 in the closed switch position, providing a proof-of-operation or fiber-break alarm feature.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

We claim:

1. An optical sensor, comprising:
   at least one optical illumination path structured to transmit an interrogating signal light beam in a direction,
   at least one wavelength dependent structure comprising at least one wavelength sensitive element receiving the interrogating signal light beam and changing the spectral content of the light received from said interrogating signal light beam by changing the orientation of said wavelength dependent structure relative to the direction of said interrogating signal light beam,
   at least one return optical path capable of transmitting changes in said spectral content, and
   a supportive member coupled to the wavelength dependent structure that rotates said wavelength dependent structure along its entire length relative to the directions of both said optical illumination path and said return optical path, whereby a force acting upon said wavelength-dependent structure changes the spectral content of light transmitting through said optical return path.

2. The sensor of claim 1 further including at least one optical lens optically coupled to at least one of the optical paths.

3. The sensor of claim 1 wherein said interrogating light beam has the characteristic of at least one of the group consisting of a broad spectral band and time-varying spectral content.

4. The sensor of claim 1 wherein changes in the orientation of said wavelength dependent structure to the interrogating light beam includes rotational orientation changes.

5. The sensor of claim 1 wherein the said force is of at least one type of the group consisting of mechanical, gravitational, electrical and magnetic.

6. The sensor of claim 5 wherein the said mechanical force is of at least one type of the group consisting of mechanical load, gravitational force, change of momentum, fluid pressure, vibration, torque, temperature-induced expansion, acceleration, stress and fictitious force.

7. The sensor of claim 1 further incorporating at least one flexure linkage from the wave dependent structure to the sensor component acted upon by said force.

8. The sensor of claim 1 wherein the wavelength dependent structure comprises of at least one wavelength-sensitive element of the group consisting of a ruled grating, a Littrow grating, a volume phase grating, a holographic grating, a Rugate filter or mirror, a photonic crystal, a planar Bragg mirror, a Bragg mirror incorporating multiple mirrors with phase shift cavities between them, a Bragg transmission filter, a linear variable filter, a non-linear variable filter and a surface plasmon resonant layer.

9. The sensor of claim 1 further incorporating a temperature compensator.

10. The sensor of claim 9 wherein said temperature compensator is mechanical.

11. The sensor of claim 9 wherein said temperature compensator comprises of at least one optical temperature sensor mounted in a strain-free manner independent of said force.

12. The sensor of claim 9 wherein said temperature compensator comprises at least one temperature sensor from at least one of the group consisting of fiber Bragg grating, Fabry-Perot, semiconductor bandgap, fluorescent time decay and wavelength dependent structure.

13. The sensor of claim 1 further comprising an explosion-proof switch.

14. The sensor of claim 13 wherein said explosion-proof switch further incorporates a means to continuously signal a properly operating switch and a malfunction in the optical path.

15. The optical sensor of claim 1, wherein
the lineshape of the spectral content of a peak or a valley of the signal light transmitted along said at least one return optical path is substantially symmetric as a function of wavelength.

16. A sensing system, comprising:
an interrogation instrument,
at least one optical illumination path capable of transmitting an interrogating light beam,
at least one optical sensor possessing a wavelength dependent structure receiving the interrogating light beam which changes the spectral content of the light received from said interrogating light beam in correlation to an applied force, and
at least one return optical path capable of transmitting at least one wavelength-specific spectral feature to at least one optical detector, wherein
said applied force rotates said wavelength dependent structure along its entire length relative to the directions of both said optical illumination path and said return optical path.

17. The interrogation instrument of claim 16 further including a multiplexor to interrogate multiple sensors.

18. The interrogation instrument of claim 16 further including a calibrator to calibrate spectral changes of said wavelength-dependent structure to said force.

19. The interrogation instrument of claim 16 wherein said light source emits interrogating light beam having a characteristic of at least one of broad spectral band and time-varying spectral content.

20. The interrogation instrument of claim 19 wherein said light source comprises a swept wavelength laser.

21. The interrogation instrument of claim 19 wherein said light source is a broad band amplified spontaneous emission source.

22. The interrogation instrument of claim 19 wherein said light source is an amplified fluorescent stimulated source.

23. The interrogation instrument of claim 16 further comprising at least one light source capable of emitting an interrogating light beam, at least one optical detector capable of detecting changes in spectral content of the return light, and an electronics block capable of interpreting said spectral content.

24. The interrogation instrument of claim 23 wherein said light source is a light emitting diode.

25. The interrogation instrument of claim 23 wherein said optical detector is a spectrometer.

26. The interrogation instrument of claim 23 wherein said optical detector is a wavelength sensitive interferometer.

27. The interrogation instrument of claim 23 wherein said optical detector comprises of at least one photodiode.

28. The interrogation instrument of claim 23 wherein said optical detector comprises at least one of a position-sensitive detector.

29. The interrogation instrument of claim 23 wherein said optical detector is at least one type of the group consisting of a charge-coupled device, and a complementary metal-oxide-semiconductor device.

30. The interrogation instrument of claim 23 wherein said optical detector further includes a wavelength-sensitive detector.

31. The interrogation instrument of claim 30 wherein said wavelength-sensitive detector is a linear variable filter paired with a position-sensitive optical detector.

32. A sensing device, comprising:
at least one optical illumination path capable of transmitting an interrogating light beam,
at least one optical detector,
at least one optical sensor possessing a structure receiving the interrogating light beam which changes orientation in correlation to an applied force to thereby change the spectral content of the light received from said interrogating light beam, and
at least one return optical path capable of transmitting at least one wavelength-specific spectral feature to the at least one optical detector, wherein
said applied force rotates said structure along its entire length relative to the directions of both said optical illumination path and said return optical path.

* * * * *